United States Patent [19]
Johnson

[11] Patent Number: 4,671,202
[45] Date of Patent: Jun. 9, 1987

[54] FOLDING BOAT CONSTRUCTION AND MEANS FOR MOUNTING SAME TO A CARRIER

[76] Inventor: Paul E. Johnson, 40866 Deerhorn Rd., Springfield, Oreg. 97478

[21] Appl. No.: 834,596

[22] Filed: Feb. 28, 1986

[51] Int. Cl.$^4$ ................................................ B63B 7/06
[52] U.S. Cl. .................................... 114/353; 224/42.01
[58] Field of Search ............ 114/352, 353, 354, 77 R; 280/414.1, 414.2; 224/42.01, 314, 42.03 A

[56] References Cited

U.S. PATENT DOCUMENTS

| | | | |
|---|---|---|---|
| 1,550,498 | 8/1925 | Brown | 114/353 X |
| 1,658,500 | 2/1928 | Tewes | 114/353 |
| 3,397,412 | 8/1968 | Marshall | 114/354 |
| 3,996,634 | 12/1976 | Grind | 114/352 |

Primary Examiner—Sherman D. Basinger
Attorney, Agent, or Firm—James D. Givnan, Jr.

[57] ABSTRACT

A small boat hull having fore and aft sections pivotally joined along an axis to permit one section to be swung into superimposed relationship with the other section. Locking screws extend through and join wall structures of the two sections to secure the sections in mutual alignment during boat use. A bulkhead at the interface of the fore and aft sections includes both the wall structures and an attached flexible member extending across the opposing ends of the hull sections. A platform supports the folded hull sections in place on a vehicle. The locking screws may be additionally used to secure the folded hull sections in place on the platform.

5 Claims, 9 Drawing Figures

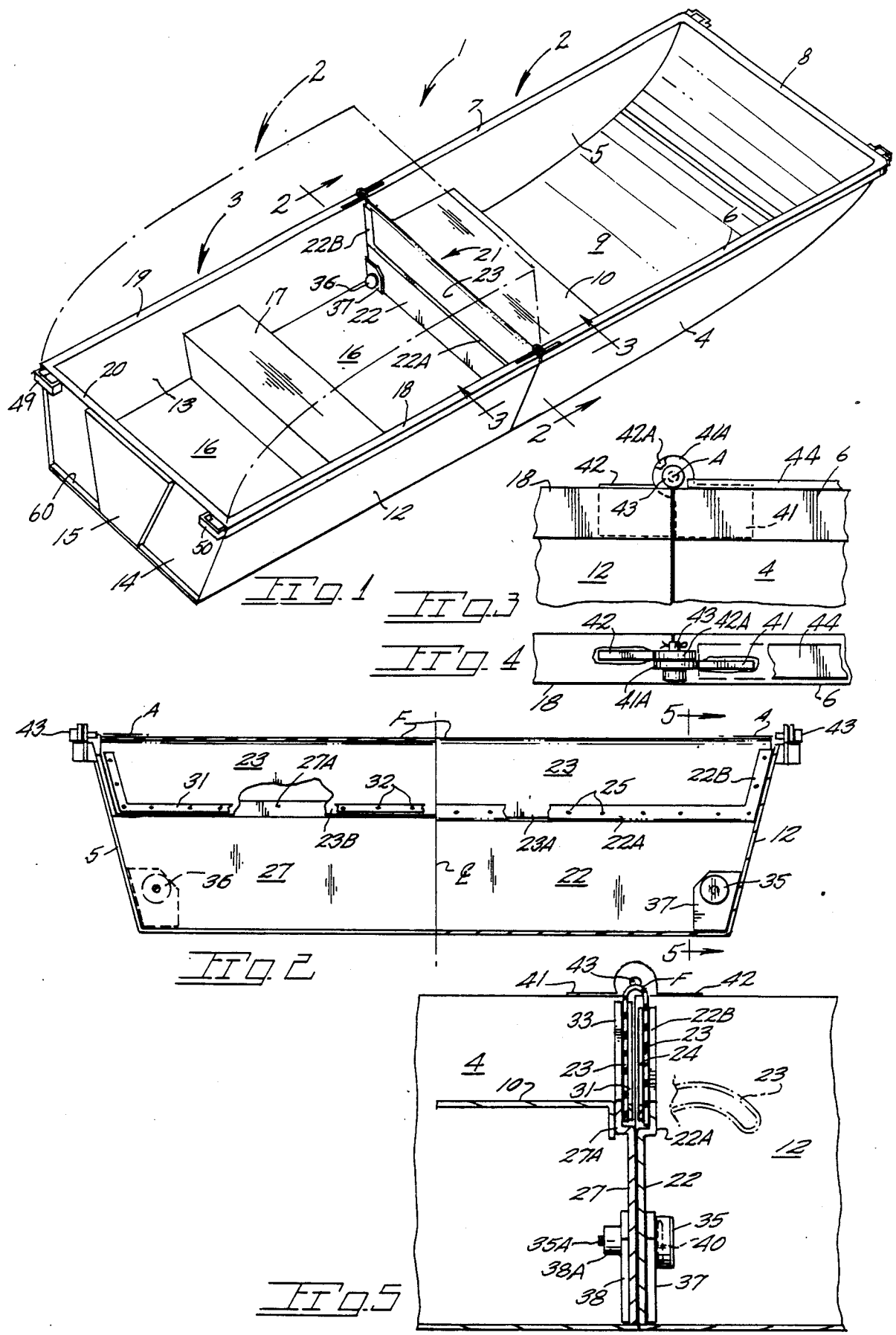

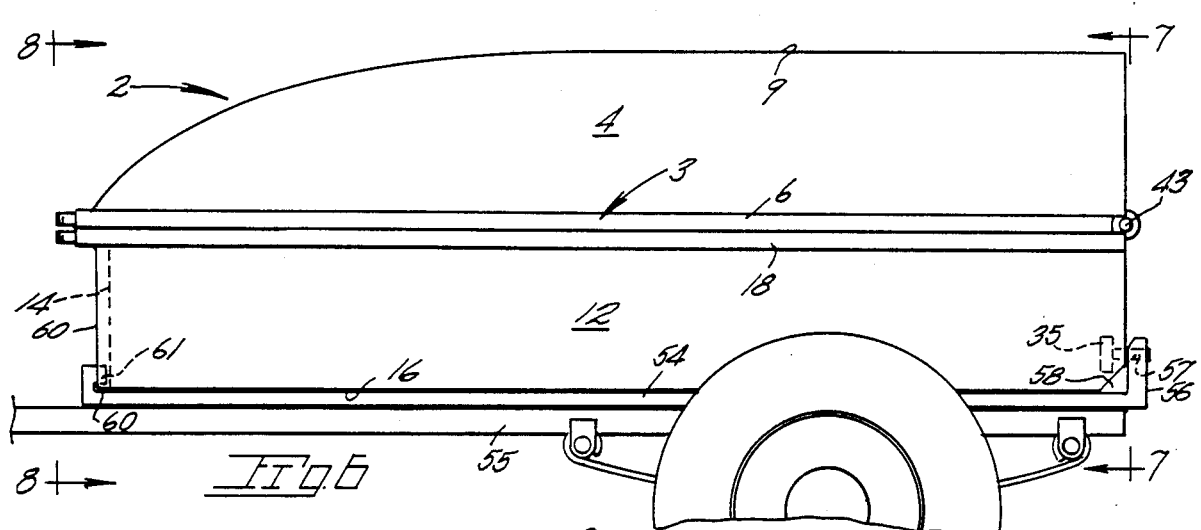
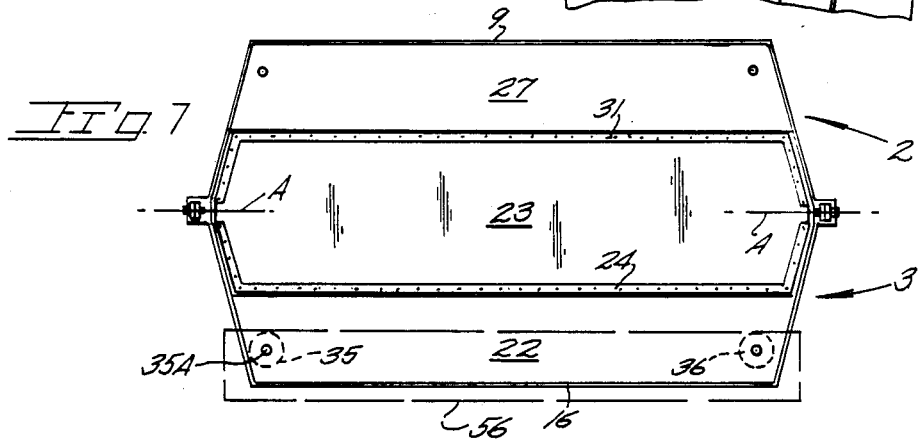
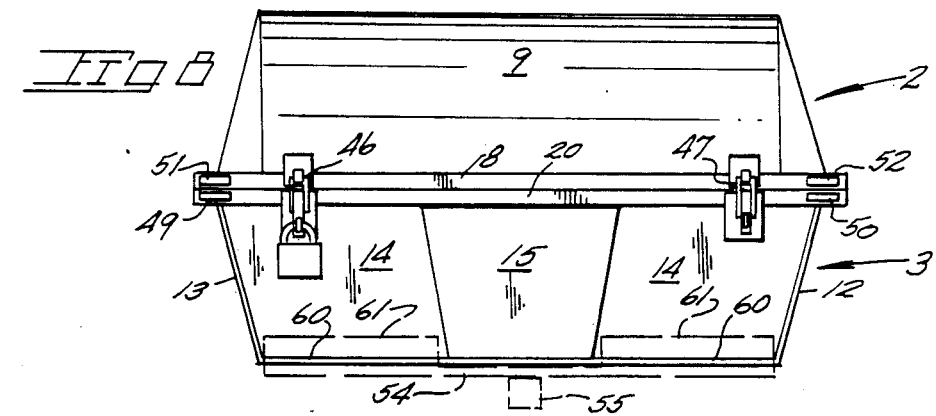
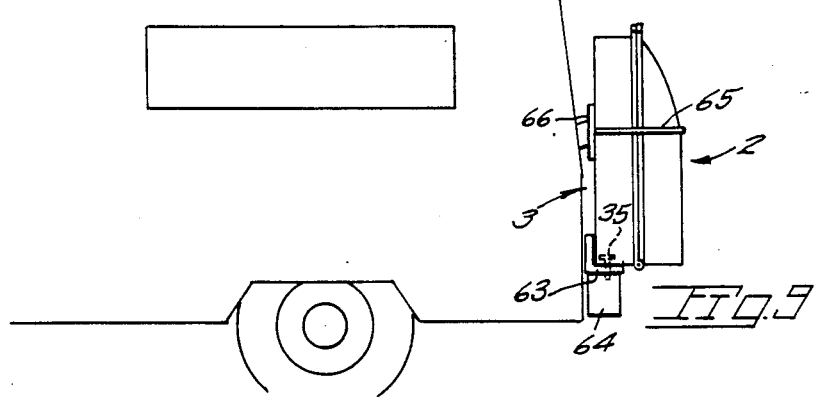

FOLDING BOAT CONSTRUCTION AND MEANS FOR MOUNTING SAME TO A CARRIER

BACKGROUND OF THE INVENTION

The present invention pertains generally to small recreational boat construction and particularly to a small boat that has pivotally joined portions that may be folded together to provide a closed, cargo receiving area.

Typically small boats are of rigid construction and transported on trailers or on the tops of vehicles or in the boxes of light trucks. Gear may be stowed in open boats during transport, but it is susceptible to theft or accidental loss. Further, the storage of small boats takes up considerable garage space with boat length usually preventing on-end or upright storage within a garage.

The general concept of collapsing boat construction has been utilized to provide portable watercraft for outdoorsmen such as hunters and fishermen. Such boats are usually of very limited capacity of one or two persons and are of nonrigid hull construction.

In wide use today are metal boats which have flotation compartments. These boats are widely used for various recreational purposes such as fishing, hunting, in addition to boating.

SUMMARY OF THE INVENTION

The present invention is embodied in boat construction which includes centrally located pivot means which permits fore and aft boat portions to be swung into a closed relationship with one another for both transport and storage purposes.

Present boat construction includes pivot means located at the gunwales to permit the gunwales of the fore and act sections of the hull to be superimposed on one another to define a closed storage area for the reception of miscellaneous gear. As storage space for such gear is usually limited within the boat towing vehicle, the user may use the closed or folded boat hull for storage of such gear in an enclosed, protected manner.

Bulkhead means of the present hull construction includes both rigid and flexible components which function to close off the hull sections both in their operative aligned position as well as when the hull sections are superimposed on one another as during transport or boat storage.

Positioning of the hull section is about a transverse axis provided by pivot means located proximate the boat gunwales. Retainer means serve to hold the hull sections in alignment during use of the boat and may be otherwise used to retain the folded boat in place on a platform during boat transport. A locking arrangement is provided to prevent access to the storage area defined by the folded hull sections, as well as to prevent hull entry for unauthorized removal of the retainers securing the hull sections in place on a transport platform.

Important objective of the present hull construction include the provision of boat hull having fore and aft sections pivotally joined to permit superimposition of one section on a remaining section for transport or hull storage purpose; the provision of boat hull construction having bulkhead means with both rigid and flexible components serving to close off the adjacent ends of the hull sections; the provision of foldable hull construction wherein retainer means serves to hold the hull sections in alignment during boat use as well as being usable to secure the folded hull to a platform for transport purposes.

BRIEF DESCRIPTION OF THE DRAWINGS

In the accompanying drawings:

FIG. 1 is a perspective view of the boat embodying the present invention;

FIG. 2 is a vertical sectional view taken along line 2—2 of FIG. 1 with parts broken away along a hull centerline;

FIG. 3 is a vertical elevational view taken along line 3—3 of FIG. 1;

FIG. 4 is a plan view of FIG. 3;

FIG. 5 is a vertical sectional view taken along line 5—5 of FIG. 2;

FIG. 6 is a side elevational view of the present boat in place on a trailer carried platform for boat transport;

FIG. 7 is an end elevational view taken along line 7—7 of FIG. 6 with the platform shown in phantom lines;

FIG. 8 is an end elevational view taken along line 8—8 of FIG. 6 with the platform shown in phantom lines; and FIG. 9 is a fragmentary side elevational view of a motor home equipped with a platform for boat transport.

BRIEF DESCRIPTION OF THE PREFERRED EMBODIMENTS

With continuing attention to the drawings wherein applied reference numerals indicate parts similarly hereinafter identified, the reference numeral 1 indicates generally a boat embodying the present invention with a forward or bow section indicated generally at 2 and a stern or rear section indicated generally at 3.

Forward section 2 includes sides 4 and 5 having side gunwales 6 and 7. A forward gunwale is at 8. A section bottom is at 9 terminating forwardly at forward gunwale 8. Bottom reinforcing structure such as lengthwise extending ribs are not shown. A seat is shown at 10.

Rearward boat section 3 similarly includes sides 12 and 13, a transom 14 having a motor receiving plate 15 and a rear section bottom at 16. One or more seats may be provided as at 17. Side gunwales are at 18 and 19 while a rear gunwale is at 20. The foregoing structure may be generally typical of known small boat construction.

At the interface of the fore and aft sections 2 and 3 is bulkhead means generally at 21 including both rigid and flexible members. A wall structure 22 extends across aft section 3 and has an offset flange 22A to which is secured one edge 23A of a flexible closure 23. Flange 22A has upwardly directed end extensions as at 22B. A clamping strip 24 is secured by fasteners 25, such as pop rivets to the marginal area 23A of the flexible closure to secure same to wall 22 and specifically its offset flanges 22A–22B. Similarly at the section interface a wall structure 27 extends across the bow section and has an offset at 27A extending thereacross to which may be secured the remaining marginal area at 23B of flexible member 23. A clamping strip 31, held in place by fasteners 32, clamps flexible member marginal area 23B to the wall structure offset 27A and to brackets 33 suitably secured in place to the sides 4 and 5 of the bow section. Flexible member 23 may be an expanse of neoprene rubber sheet having a fold line at F proximate a boat pivot axis at A when the boat sections are in alignment with one another. Flexible closure 23 provides a bulkhead component which is not obstructive to use of seat 10 as the closure may flex per FIG. 5.

Retention means are provided in the form of screw locks as at 35 and 36 each having a threaded segment as at 35A in FIG. 5. Pairs of apertured plates at 37 and 38, as typically shown in FIG. 5, are secured respectively to wall structure 22 of aft section 3 and to wall structure 27 of forward section 2 with a boss 38A in plate 38 being internally threaded to receive the screw lock 35 to securely hold the fore and aft hull sections in abutting relationship. If so desired, the screwlocks 35 and 36 may be fitted with an O-ring as at 40 to prevent water seepage between plate 37 and the handgrip of the screw lock. Screw locks 35 and 36, in addition to maintaining the fore and aft sections 2 and 3 of the boat in operative, aligned relationship, may additionally be utilized to attach the boat, when in folded configuration, to a platform as later described.

Pivot means are mounted within the boat gunwales and as typically shown in FIGS. 3 and 4 comprise hinge members 41 and 42 each mounted in a recessed manner inset within the slotted openings formed in gunwales 6 and 18. Hinge members 41 and 42 include ears 41A and 42A which define aligned openings for the reception of a headed pivot pin 43 secured as by a cotter key. The major axis at A of pivot pins 43 constitutes the rotational axis of the fore and aft sections of the boat and is offset somewhat above the upper surface of the side gunwales. Such an offset of the pivot axis from the gunwales upper surface permits weatherstripping as at 44 to be applied along the gunwales 6, 7 and 8 of the forward section which weatherstripping effects a virtually weathertight closure when the forward section is rotated to the folded, broken line position of FIG. 1.

When the fore and aft sections 2 and 3 are in superimposed relationship, the interior of the sections may receive miscellaneous items stowed therein for transport. As shown in FIG. 8 latches at 46 and 47 are of the locking buckle type with at least one latch having a hasp for the reception of a padlock shackle to secure the stowed contents against loss or theft. Handgrips at 49, 50, 51 and 52 affixed to the end gunwales facilitate positioning of the fore and aft sections as well as loading of the folded boat into place for transport.

A platform at 54 in FIG. 6 receives the folded boat hull for transport of same. Said platform may be, as shown in FIG. 6, integral with a trailer chassis 55 or other vehicle chassis, such as for example, the box of a pickup truck. Said platform includes a transverse end member 56 having spaced apart threaded bores as at 57 to receive locking screws 35 and 36. A pair of gussets, one of which is shown at 58, additionally confines the aft hull section 3 against lateral displacement on the platform. Typically transom construction of small metal boats includes a transom lip 60 which projects rearwardly from the transom 14. Platform 54 accordingly may be additionally equipped with transversely disposed cleats 61 which closely overlie a horizontal portion of the transom lip. Accordingly, the transom end of aft section 3 is confined against movement away from platform 54 or lateral displacement thereon. Removal of the folded boat from platform 54 requires the unlocking of buckles 46 and 47 for access locking screws 35 and 36 whereupon same may be retracted out of engagement with transverse platform member 56 to permit lifting and sliding movement to be imparted to aft section 3 for disengagement from the platform end member 56 and cleats 61.

With reference to FIG. 9 a modified platform is indicated at 63 which is located in place atop a motor home rear bumper 64. The locking screws 35 and 36 are used to also seat within threaded bores in platform 63 to securely attach aft section 3 to the vehicle bumper. A supplemental attachment of the folded boat hull to the vehicle may be achieved by means of a strap 65 extending about the folded boat hull and thence being suitably secured to a vehicle attached mounting bracket 66.

While I have shown but a few embodiments of the invention, it will be apparent to those skilled in the art that the invention may be embodied still otherwise without departing from the spirit and scope of the invention.

Having thus described the invention, what is desired to be secured in a Letters Patent is:

1. Boat hull construction comprising,
    a bow section including gunwales,
    an aft section including gunwales,
    pivot means jointly carried by said gunwales permitting rotation of one section out of alignment with the other section and into superimposed relationship with the remaining section for convenient transport or storage of the boat hull,
    bulkhead means extending transversely across the bow section and said aft section at adjacent extremities of the sections, said bulkhead means including wall structures, a flexible member affixed to said wall structures and disposed transversely across the bow and aft sections and of folded configuration when said bow section and said aft section are in alignment with one another, said flexible member constituting an end closure for the bow and aft sections both when same are operatively disposed in alignment with one another and when same are in said superimposed relationship with one another, and
    retention means coupling said bow and aft sections at points remote from said pivot means, said retention means detachable from one of said sections to permit repositioning of the remaining section into superimposed relationship with the aft section.

2. The boat hull construction claimed in claim 1 wherein said flexible member has marginal areas secured to said wall structures.

3. The boat hull construction claimed in claim 2 wherein said flexible member has a fold line located substantially in alignment with said pivot means when the bow and aft sections are in alignment with one another.

4. The boat hull construction claimed in claim 1 wherein said retention means is embodied in multiple screw locks, internally threaded plate members in place on one of said wall structures to receive said locking screws.

5. The boat hull claimed in claim 4 wherein said multiple screw locks extend exteriorly of one of said wall structures when said bow section and said after section are in a superimposed relationship on a supporting structure, said screw locks additionally operate to secure the boat hull to said supporting structure.

* * * * *